United States Patent
Billington et al.

(10) Patent No.: US 10,133,977 B2
(45) Date of Patent: *Nov. 20, 2018

(54) PRODUCT HOLDER

(71) Applicant: WAVEMARK, INC., Concord, MA (US)

(72) Inventors: James Barry Billington, North Attleboro, MA (US); Richard Eugene Leitermann, Arlington, MA (US)

(73) Assignee: WAVEMARK, INC., Concord, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,527

(22) Filed: Jul. 14, 2016

(65) Prior Publication Data

US 2016/0321532 A1 Nov. 3, 2016

Related U.S. Application Data

(63) Continuation of application No. 14/528,662, filed on Oct. 30, 2014, now Pat. No. 9,418,329.

(51) Int. Cl.
*G06K 19/06* (2006.01)
*G06K 19/077* (2006.01)
*A47F 10/02* (2006.01)
*B65D 25/20* (2006.01)
*A47F 10/00* (2006.01)

(52) U.S. Cl.
CPC ........ *G06K 19/07758* (2013.01); *A47F 10/02* (2013.01); *B65D 25/205* (2013.01); *G06K 19/0772* (2013.01); *G06K 19/0776* (2013.01); *A47F 2010/005* (2013.01); *A47F 2010/025* (2013.01)

(58) Field of Classification Search
CPC ................ G06K 17/00; G06K 2017/0045
USPC .................................. 235/385, 492
See application file for complete search history.

(56) References Cited

U.S. PATENT DOCUMENTS

| | | |
|---|---|---|
| 4,132,309 A | 1/1979 | Shaylor |
| 6,811,064 B2 | 11/2004 | Salem |
| 7,015,815 B1 | 3/2006 | Feibelman |
| 7,286,900 B1 | 10/2007 | Frederick et al. |
| 7,301,460 B2 | 11/2007 | Coste |
| 7,648,065 B2 | 1/2010 | Marino |
| 7,924,157 B2 * | 4/2011 | Weller ................ B65D 27/00 340/10.1 |
| 8,035,524 B2 | 10/2011 | Sakama et al. |
| 8,174,392 B1 * | 5/2012 | Saghbini ............ G06F 19/3462 235/385 |
| 8,534,562 B2 | 9/2013 | Forster |
| 9,418,329 B2 * | 8/2016 | Billington ............... A47F 10/02 |
| 2001/0006368 A1 | 7/2001 | Maloney |
| 2002/0196126 A1 | 12/2002 | Eisenberg et al. |
| 2005/0099303 A1 | 5/2005 | Zuckerman |
| 2006/0265246 A1 | 11/2006 | Hoag |
| 2012/0255956 A1 | 10/2012 | Nam |

* cited by examiner

*Primary Examiner* — Seung Lee
(74) *Attorney, Agent, or Firm* — Jacob R. Lenzke

(57) ABSTRACT

A holder for a product package includes a substrate having an inside surface, with opposing end portions of the substrate being folded upwards. The holder also includes a securing member disposed on at least one of the end portions, the securing member configured to secure the product package within the end portions of the substrate. The holder also includes a RFID tag disposed on the substrate.

20 Claims, 5 Drawing Sheets

PRODUCT HOLDER

CLAIM OF PRIORITY UNDER 35 U.S.C. § 119 AND 35 U.S.C. § 120

This application is a continuation of U.S. patent application Ser. No. 14/528,662 entitled "Product Holder" filed on Oct. 30, 2014, now U.S. Pat. No. 9,418,329. The preceding application is incorporated by reference herein in its entirety.

BACKGROUND

Many disposable or one-time-use products are tracked using RFID-based inventory-tracking systems. These inventory tracking systems enable continuous tracking of the products beginning at the manufacturing process, through the supply chain, and culminating at a medical facility or hospital. This tracking provides the data needed to assure that the correct products are always on-hand when needed, that they are restocked after use, that expired products are not erroneously used, and that recalled products are removed from shelves at the point of use.

Some of these products, such as medical products like guide wires or drug-eluted stents, are stored in foil pouches or foil-lined boxes. Conventional methods of applying RFID tags on such foil pouches and boxes make the tags difficult or impossible to read. The foil prevents the magnetic field of the RFID antenna from passing through the coils of the RFID tag antenna. Thus, the products are often not counted by the RFID inventory system.

SUMMARY

In a first exemplary embodiment, a holder for a product package, the holder includes a substrate having an inside surface, with opposing end portions of the substrate being folded upwards. The holder also includes a securing member disposed on at least one of the end portions, with the securing member configured to secure the product package within the end portions of the substrate. The holder also includes a RFID tag disposed on the substrate.

In a second exemplary embodiment, a holder for a trackable product package includes a substrate having an inside surface, and including two spaced folds in a first direction along one of a length or a width of the substrate, with ends of the substrate being folded upwards along the folds. The holder also includes a block disposed on the inside surface between the two folds, the product package configured to rest on the block when disposed in the holder. The holder also includes an adhesive disposed on a portion of the inside surface between one of the two folds and an adjacent one of the ends of the substrate, the adhesive configured to secure the product package within the ends of the substrate. The holder also includes a RFID tag disposed on the substrate.

In a third exemplary embodiment, a system for storing a trackable product includes a product disposed in a container, the container including foil. The system also includes a holder for the container. The holder includes a substrate having an inside surface, and including two spaced folds in a first direction along one of a length or a width of the substrate, the folds dividing the substrate into a first portion, a second portion, and a middle portion in between the first and second portions and in between the two folds. The holder also includes an adhesive disposed on the first and second portions on the inside surface, the adhesive configured to secure the container within the first and second portions. The holder also includes a RFID tag disposed on the substrate. A lower surface of the container is spaced from the middle portion of the substrate when the container is disposed in the holder.

BRIEF DESCRIPTION OF THE DRAWINGS

The following drawing figures, which form a part of this application, are illustrative of described technology and are not meant to limit the scope of the claims in any manner, which scope shall be based on the claims appended hereto

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. The following detailed description is, therefore, not to be taken in a limiting sense.

Figure 1A:
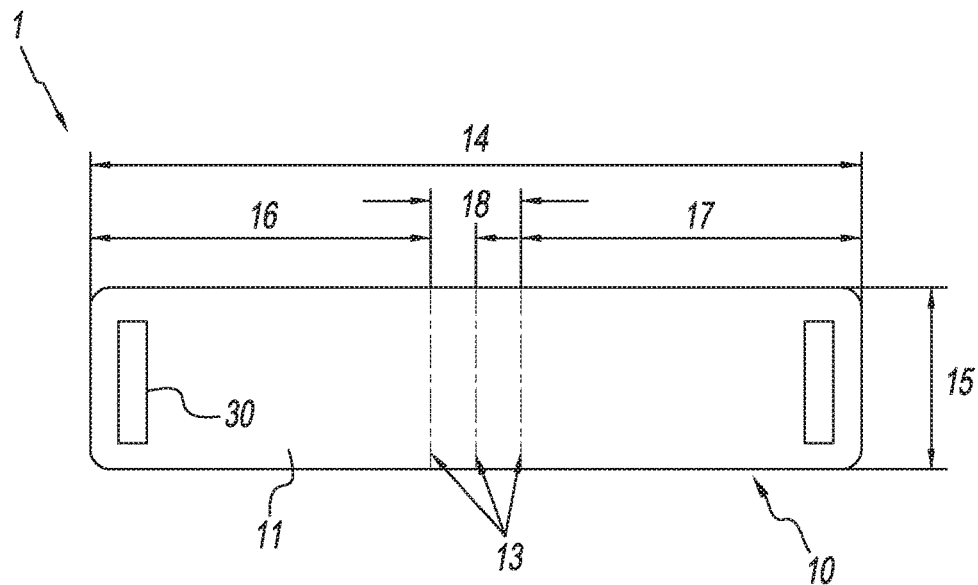
FIG. 1A is a plan view of a holder according to an embodiment of the invention.

A holder 1 for a product is shown in FIGS. 1A-1D. As shown in FIG. 1A, the holder 1 includes a generally flat substrate 10 having an inside surface 11 and an outside surface 12. In the illustrated embodiment, the substrate 10 is rectangular, with the length 14 more than twice the width 15. However, the substrate 10 could also be rounded or square-shaped. At least two generally parallel folds or perforations 13 (hereinafter "folds") are formed spaced along the length 14 of the substrate and substantially spanning its width 15. The folds 13 allow end portions 16, 17 of the substrate 10 to be folded upwards in order to hold a product package 100. Alternatively, the folds 13 could be formed spaced along the width 15 of the substrate, and extending across the length 14. Additionally, the folds 13 may be non-parallel, for example in a V shape.

The substrate 10 may be formed of any material suitable to be bent and folded. For example, the substrate 10 may be formed of a non-transparent material such as cardboard or paperboard. The substrate 10 may also be formed of semi-transparent or transparent materials such as mylar or polyester. In an exemplary embodiment as shown in FIGS. 1C and 1D, a semi-transparent or transparent material is used for the substrate 10 to allow increased visibility of the product package 100 being held in the holder 1 or any labeling disposed thereon.

The product package 100 may be a box, a pouch, or any other type of package. The product within the package may be any product required to be tracked within a supply chain, including, but not limited to, a medical product, a perishable product, or food. A product manufacturer may ship the holder 1 and its associated product package 100 together as a system, so that the product can be stored and tracked from the manufacturer all the way through the supply chain. Alternatively, the product package 100 can be placed in the holder 1 further downstream in the supply chain. In this case, the substrate 10 may be manufactured with fold lines drawn on the inside surface 11 to be folded by a user upon use. Alternatively, the substrate 10 may be manufactured with indented folds 13 pre-formed.

Although FIG. 1A shows three folds 13 in the substrate 10, two folds 13 may be present, as shown in FIG. 2, or more than three folds 13 may be present. The presence of more than two folds 13 allows the storing of packages of varying thicknesses, as the user can choose which two of the folds 13 at which to fold the substrate 10 upwards. For example, as shown in FIG. 1A, the three folds 13 could be formed in the substrate 10 to allow storing of packages having a thickness of ½" or 1".

Figure 1B:
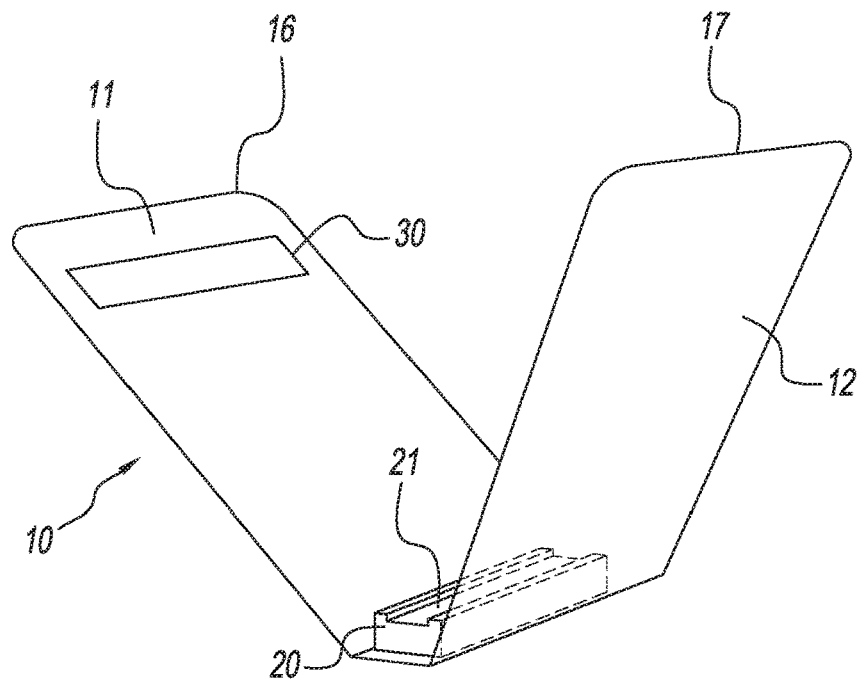
FIG. 1B is a perspective view of the holder of FIG. 1A.
Figure 1C:
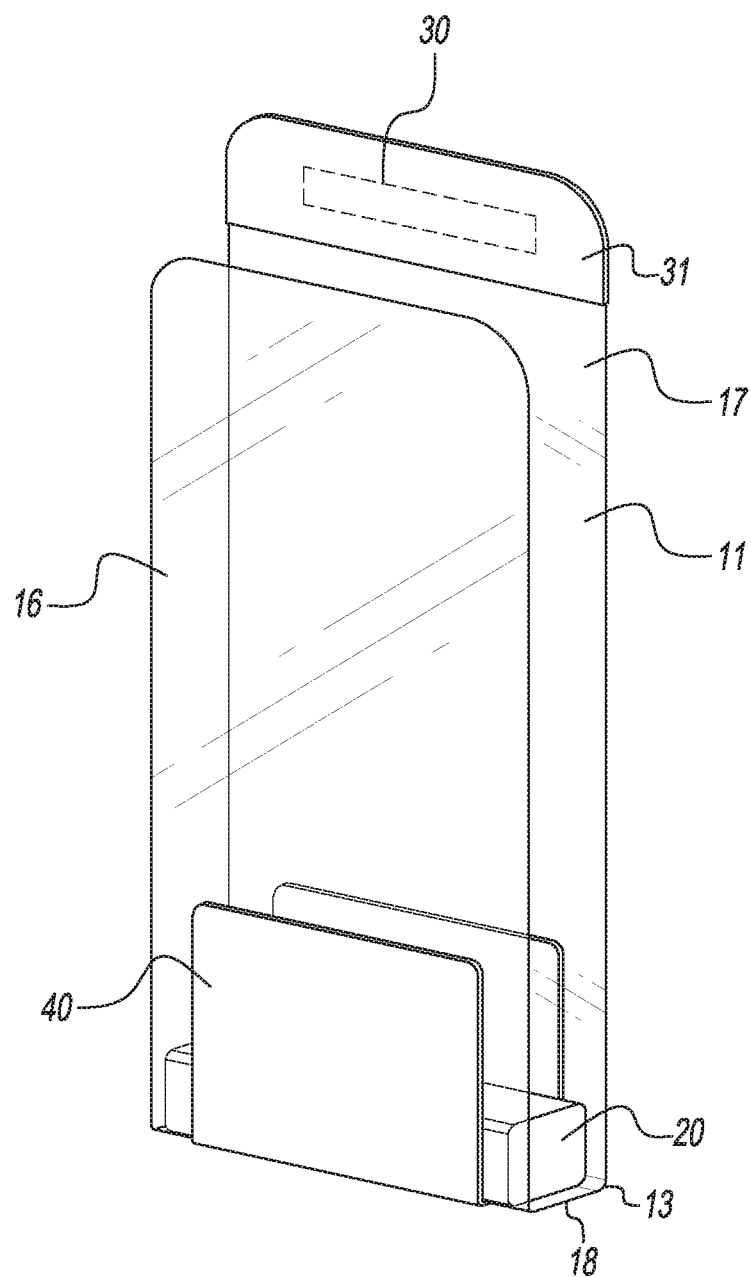
FIG. 1C is a perspective view of a holder according to an embodiment of the invention.
Figure 1D:
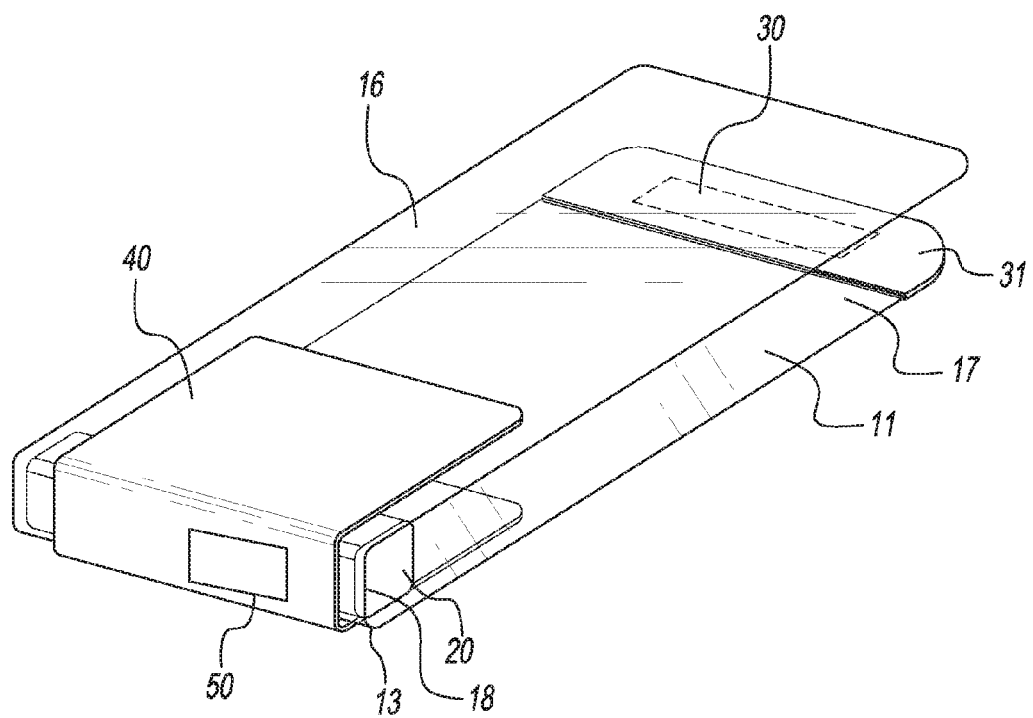
FIG. 1D is a perspective view of the holder of FIG. 1C.
Figure 2A:
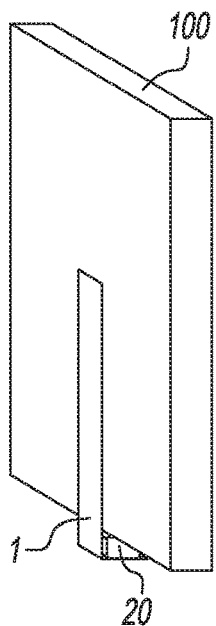
FIGS. 2A and 2B are perspective views of a holder holding a product package according to embodiments of the invention.
Figure 2B:
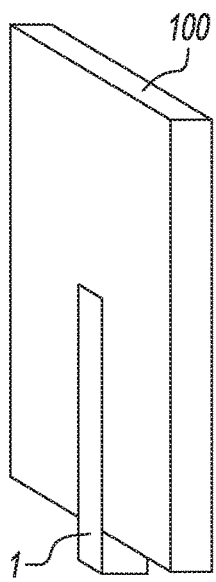

FIGS. 1B and 2A show a block 20 disposed on the inside surface 11 in a middle portion 18 between the two folds 13. The block 20 provides spacing between the product package 100 and the RFID tag 50 to increase the readability of a RFID tag 50 attached to the holder 1. Particularly when the product package 100 includes foil, if the product package 100 is placed too close to the RFID tag 50, a RFID scanner may be unable to properly read the RFID tag 50. Alternative embodiments as shown in FIG. 2B may omit the block 20 and provide the spacing between the holder 1 and the product package 100 by the product package 100 being secured to the holder at a different (lower) point on the package 100. In other alternatives, the thickness of the substrate 10 is sufficient to provide the minimum spacing between the product package 100 and the RFID tag 50.

As discussed above, the RFID tag 50 is included on the holder 1 to allow the product 100 to be trackable. Although the tag 50 is referred to as a RFID tag, those skilled in the art would recognize that other types of tags, such as NFC tags, could be used. As shown in FIG. 1D, the RFID tag 50 is secured to the outside surface 12 of the substrate 10 on the middle portion 18. In other embodiments, the RFID tag 50 may be disposed elsewhere, such as on the inside surface 11 of the substrate 10. RFID tags are read by directional magnetic fields, and to increase readability of the tag 50, it is desirable for the tag 50 to be perpendicular to the vertical direction of RFID reader. The arrangement shown in FIG. 1D and in FIG. 3 (with the RFID tag 50 being placed on a bottom side of the holder) places the RFID tag 50 in close proximity to the RFID field generated by a RFID inventory tracking system and spaces the product package 100 from the RFID tag 50.

As shown in FIG. 2A, the product package 100 is configured to rest on the block 20 when disposed in the holder 1. In some embodiments, the block has a thickness of ¼"-⅜". The block 20 may also serve as a weight to help the holder 1 remain upright. In other embodiments, the block 20 could be placed underneath the holder 1 on the outside surface 12 of the substrate 10. In such embodiments, the RFID tag 50 may be placed underneath the block 20 to provide the necessary spacing between the product package 100 and the RFID tag 50. The block 20 may be permanently secured to the substrate 10 (for example, with an adhesive) or may be loosely placed with the middle portion 18. The block 20 may be made of any suitable material, such as rubber, foam, or the like. The block 20 may also include a groove or slot 21 to receive an end portion of the product package 100, particularly when the package 100 is a pouch (as in FIG. 3).

A securing member 30 is disposed on the inside surface 11 on at least one of the end portions 16, 17. In an exemplary embodiment, the securing member includes an adhesive. However, other securing members such as Velcro may be used. In use, the adhesive 30 secures the product 100 within the end portions 16, 17. This may be accomplished by the end portions 16, 17 being secured to respective sides of the product package 100, as shown in FIG. 2, or alternatively the end portions 16, 17 being secured to each other with the product package 100 disposed within. In an exemplary embodiment, the adhesive 30 is strong enough to secure the end portions 16, 17 to the product package 100 during storage, and throughout use of the product. Because the RFID tag 50 is often unique to the specific product being held within the holder 1, it is desirable to maintain this connection between the holder 1 and the product package 100 so that the product package 100 doesn't inadvertently fall out of the holder 1 and mistakenly get placed back in the wrong holder. After use, a user may simply dispose of holder 1 and empty product package 100 together. As best shown in FIG. 1C, the adhesive 30 may be covered by a removable liner 31 for further ease of use. The liner may be bigger than the space taken up by the adhesive 30 to make it easier for a user to pull the liner 31 off of the adhesive 30.

Figure 3:
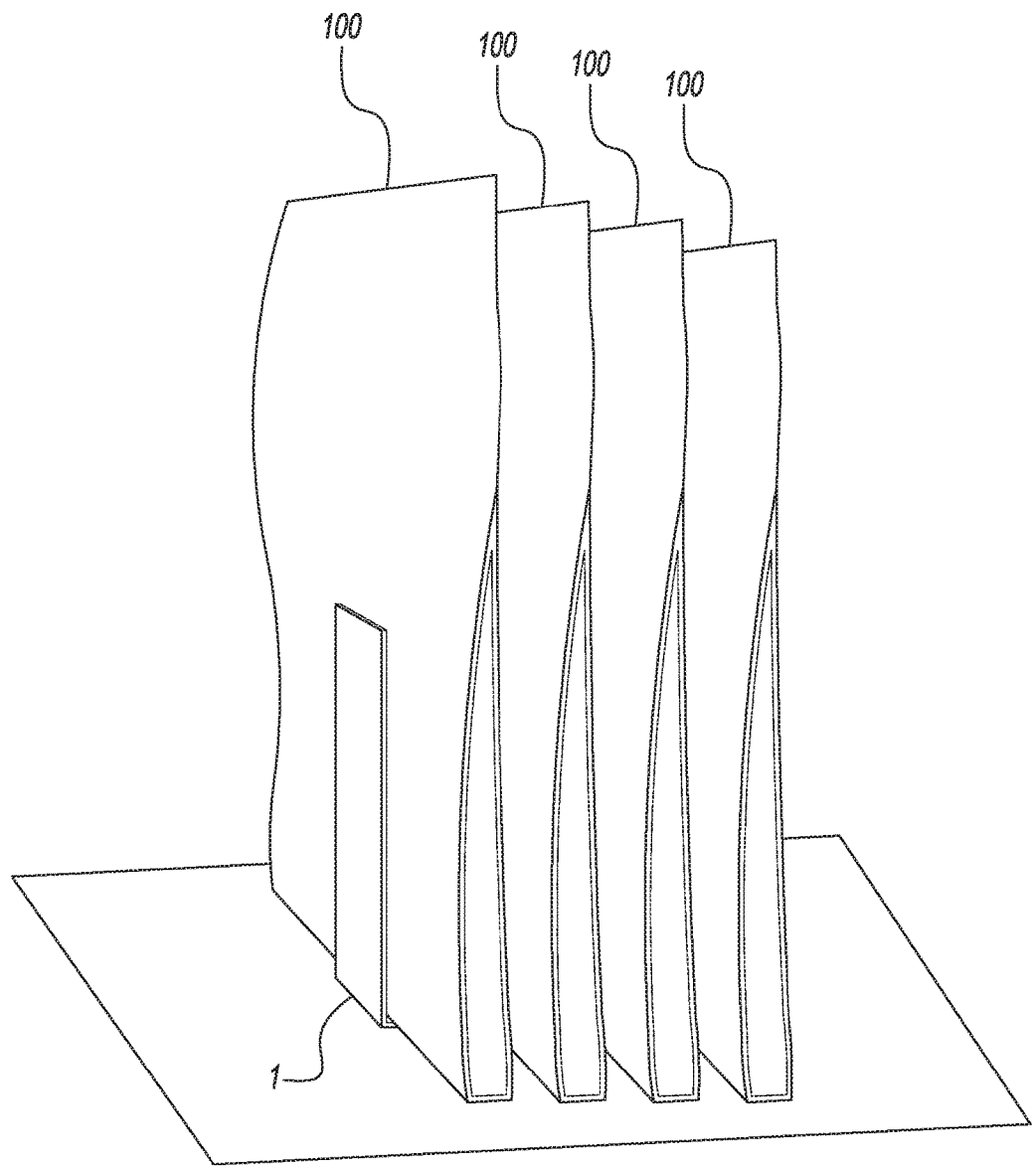
FIG. 3 is a perspective view of a series of holders holding product packages according to an embodiment of the invention.

The holder 1 may also be advantageous when the product package 100 includes foil lining or a foil pouch. In particular, in an embodiment where the product package 100 is a foil pouch, the holder 1 allows the pouch to stand in orderly fashion by providing the edge of the pouch with a square-shaped edge and additional width, similar to the result of putting each pouch into a box of its own and arranging the boxes like books on a bookshelf. Thus, as shown in FIG. 3, a series of holders 1 holding product packages 100 may be neatly arranged next to each other, and RFID tags associated with each of the holders 1 may be accurately read by a RFID scanner. This is made possible by the holders 1 at least in part because the RFID tags are not sandwiched between two layers of foil. Further, foil pouches do not stand up on their own (book-style). Instead, they flex and overlap, and disrupt the neat arrangement of products needed for quick identification by an RFID scanner.

While various embodiments have been described for purposes of this disclosure, various changes and modifications may be made which are well within the scope of the present disclosure. Numerous other changes may be made which will readily suggest themselves to those skilled in the art and which are encompassed in the spirit of the disclosure and as defined in the appended claims.

The invention claimed is:

1. A holder for a product package, the holder comprising:
   a substrate having an inside surface, opposing end portions of the substrate being folded upwards;
   a securing member disposed on each one of the end portions, each securing member configured to secure one of the end portions to the product package such that the product package is disposed between the end portions of the substrate when the end portions are secured to the product package;
   a perforation disposed on at least one of the end portions underneath the securing member; and
   a RFID tag disposed on the substrate.

2. The holder of claim 1, wherein the substrate is at least partially transparent.

3. The holder of claim 1, wherein the holder generally has a U-shape when the end portions of the substrate are each folded.

4. The holder of claim 1, wherein at least one of the securing members includes an adhesive.

5. The holder of claim 4, wherein each one of the securing members includes an adhesive.

6. The holder of claim 1, wherein the RFID tag is disposed on an outside surface of the substrate.

7. The holder of claim 1, further comprising a block disposed on the inside surface between the end portions, the product package configured to rest on the block when disposed in the holder.

8. The holder of claim 7, wherein the block includes a groove to receive an edge of the product package, allowing the product package to stand upright within the holder.

9. The holder of claim 7, wherein the RFID tag at least partially opposes the block.

10. The holder of claim 1, wherein the substrate includes two spaced folds in a first direction along one of a length or a width of the substrate, the end portions of the substrate being folded upwards along the folds.

11. The holder of claim 10, wherein the holder includes more than two folds, the end portions of the substrate being folded upwards along any two of the folds.

12. The holder of claim 10, wherein the folds are generally in a middle of the substrate along the first direction.

13. The holder of claim 1, wherein the substrate includes a plurality of the perforations spaced in a first direction along one of a length or a width of the substrate.

14. The holder of claim 13, wherein the perforations extend along substantially an entirety of the substrate in the first direction.

15. The holder of claim 13, wherein the perforations are substantially parallel.

16. The holder of claim 1, wherein the length of the substrate is at least double the width of the substrate.

17. A holder for a trackable product package, the holder comprising:
a substrate having an inside surface, and including two spaced perforations in a first direction along one of a length or a width of the substrate;
a block disposed on the inside surface between the two perforations, the product package configured to rest on the block when disposed in the holder;
an adhesive disposed on a portion of the inside surface between one of the two perforations and an adjacent one of the ends of the substrate, the adhesive configured to secure the product package within the ends of the substrate; and
a RFID tag disposed on the substrate.

18. A system for storing a trackable product, the system comprising:
a product disposed in a container, the container including foil; and
a holder for the container, the holder comprising:
a substrate having an inside surface, and including two spaced perforations in a first direction along one of a length or a width of the substrate, the folds dividing the substrate into a first portion, a second portion, and a middle portion in between the first and second portions and in between the two perforations;
an adhesive disposed on the first and second portions on the inside surface, the adhesive configured to secure the first and second portions to opposing sides of the container such that the container is disposed between the first and second portions when the first and second portions are secured to the container; and
a RFID tag disposed on the substrate,
wherein a lower surface of the container is spaced from the middle portion of the substrate when the container is disposed in the holder.

19. The system of claim 18, wherein the holder further comprises a block disposed on the inside surface between the end portions, the container configured to rest on the block when disposed in the holder.

20. The system of claim 19, wherein the block includes a longitudinal slot to receive an edge of the container, allowing the container to stand upright within the holder.

* * * * *